(12) United States Patent
Wrycza et al.

(10) Patent No.: US 10,183,845 B2
(45) Date of Patent: Jan. 22, 2019

(54) GRIPPING DEVICE AND A METHOD FOR RECEIVING PIECE OBJECTS

(71) Applicant: Fraunhofer-Gesellschaft zur Förderung der angewandten Forschung e.V., München (DE)

(72) Inventors: Philipp Wrycza, Waltrop (DE); Martin Fiedler, Dortmund (DE); Mathias Rotgeri, Dortmund (DE); Martin Döltgen, Dortmund (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 0 days.

(21) Appl. No.: 15/549,011

(22) PCT Filed: Feb. 3, 2016

(86) PCT No.: PCT/EP2016/052312
§ 371 (c)(1),
(2) Date: Aug. 4, 2017

(87) PCT Pub. No.: WO2016/124658
PCT Pub. Date: Aug. 11, 2016

(65) Prior Publication Data
US 2018/0029845 A1    Feb. 1, 2018

(30) Foreign Application Priority Data
Feb. 6, 2015  (DE) ........................ 10 2015 202 181

(51) Int. Cl.
*B64D 1/22* (2006.01)
*B66C 1/66* (2006.01)

(52) U.S. Cl.
CPC . *B66C 1/66* (2013.01); *B64D 1/22* (2013.01)

(58) Field of Classification Search
CPC .......... B66C 1/66; B64D 1/22; B25J 15/0253; B25J 15/086; B25J 15/106
(Continued)

(56) References Cited

U.S. PATENT DOCUMENTS

| | | | | |
|---|---|---|---|---|
| 1,599,067 A | * | 9/1926 | Segelhorst | E21B 31/18 166/55.6 |
| 3,428,356 A | * | 2/1969 | Anderson | B66C 1/66 294/110.1 |

(Continued)

FOREIGN PATENT DOCUMENTS

| | | |
|---|---|---|
| CA | 925906 A | 5/1973 |
| FR | 2210563 A1 | 7/1974 |

(Continued)

OTHER PUBLICATIONS

"International Application No. PCT/EP2016/052312, International Preliminary Report on Patentability dated Aug. 17, 2017", (Aug. 17, 2017), 8 pgs.

(Continued)

*Primary Examiner* — Dean J Kramer
(74) *Attorney, Agent, or Firm* — Schwegman Lundberg & Woessner, P.A.

(57) ABSTRACT

A gripping device and method for receiving piece objects from above is described. The gripping device includes movable gripping elements for gripping the piece object by way of an inwards movement of the gripping elements, wherein the gripping elements are arranged around a receiving opening which is delimited by the gripping elements, and the gripping device below the receiving opening includes a guide which surrounds the receiving opening for the lateral guidance of the gripping device with the approach of the gripping device onto the piece object. An inner diameter of the guide at a lower end of the guide is larger (Continued)

than a largest possible diameter of the receiving opening, wherein the inner diameter of the guide tapers upwards.

10 Claims, 5 Drawing Sheets

(58) Field of Classification Search
USPC .................. 294/82.35, 90, 113; 244/172.4
See application file for complete search history.

(56) References Cited

U.S. PATENT DOCUMENTS

| | | | | |
|---|---|---|---|---|
| 3,666,216 A | * | 5/1972 | Nagy | B63B 21/66 |
| | | | | 244/1 R |
| 4,121,868 A | | 10/1978 | Pierce et al. | |
| 4,173,324 A | * | 11/1979 | Rudmann | B64G 4/00 |
| | | | | 244/172.5 |
| 4,177,964 A | * | 12/1979 | Hujsak | B64G 1/646 |
| | | | | 114/250 |
| 4,360,230 A | * | 11/1982 | Wood | B66C 1/66 |
| | | | | 294/82.3 |
| 4,391,423 A | * | 7/1983 | Pruett | B64G 1/646 |
| | | | | 244/115 |
| 4,431,333 A | * | 2/1984 | Chandler | B64G 1/641 |
| | | | | 244/172.4 |
| 4,547,163 A | | 10/1985 | Langpaap et al. | |
| 5,511,748 A | * | 4/1996 | Scott | B64G 1/1078 |
| | | | | 244/172.5 |
| 6,254,035 B1 | * | 7/2001 | Howard | B64G 1/24 |
| | | | | 244/172.4 |
| 7,648,183 B2 | | 1/2010 | Cornwell | |
| 7,976,084 B2 | * | 7/2011 | Mogedal | B66C 1/66 |
| | | | | 294/66.1 |
| 8,251,307 B2 | * | 8/2012 | Goossen | B64C 39/024 |
| | | | | 244/23 C |
| 2007/0222244 A1 | | 9/2007 | Cornwell | |
| 2011/0084162 A1 | * | 4/2011 | Goossen | B64C 39/024 |
| | | | | 244/12.1 |
| 2013/0299640 A1 | * | 11/2013 | Kelly | B66C 1/38 |
| | | | | 244/137.4 |

FOREIGN PATENT DOCUMENTS

| | | |
|---|---|---|
| GB | 2214158 A | 8/1989 |
| KR | 20140115711 A | 10/2014 |
| SU | 1379233 A1 | 3/1988 |

OTHER PUBLICATIONS

"German Application Serial No. 10 2015 202 181.5 Examination Report dated Aug. 24, 2015", (Aug. 24, 2015), 6 pgs.

"International Application No. PCT/EP2016/052312, International Search Report dated Apr. 13, 2016", (Apr. 13, 2016), 7 pgs.

"International Application No. PCT/EP2016/052312, Written Opinion dated Apr. 13, 2016", (Apr. 13, 2016), 6 pgs.

* cited by examiner

Fig. 2

GRIPPING DEVICE AND A METHOD FOR RECEIVING PIECE OBJECTS

PRIORITY APPLICATIONS

This application is a U.S. National Stage Filing under 35 U.S.C. 371 from International Application No. PCT/EP 2016/052312, filed on 3 Feb. 2016, and published as WO2016/124658 on 11 Aug. 2016, which claims the benefit of priority to German Application No. 10 2015 202 181.5, filed on 6 Feb. 2015; which applications and publication are incorporated herein by reference in their entirety.

The invention relates to a gripping device for receiving piece objects from above. The invention moreover relates to a method for receiving piece objects from above whist using such a gripping device.

A device for receiving piece objects (piece goods/unit loads) from above and known from the state of the art is described in the document KR 20140115711A. This device comprises an unmanned aircraft as well as a gripping device. The gripping device is attached to a lower side of the aircraft and comprises movable gripping elements which are configured to receive the piece object by way of an inwards movement of the gripping elements. Here, the gripping elements are designed as pincer arms.

However, such a gripping device is only suitable for receiving piece objects to a limited extent, particularly on being used an aircraft such as a drone. On the one hand, the difficulty stems from the fact the pincer arms only form a small contact surface with the piece object when this is received, which can lead to the received piece object being insecurely held. On the other hand, a precisely targeted leading of the gripping device onto the piece object can represent a particular challenge, particularly with the use of the gripping device on a drone in an environment of a strong air turbulence.

It is the object of the present invention to suggest a gripping device which is suitable for receiving piece objects from above, wherein on the one hand, before the receiving, the gripping device can be led precisely onto the piece object to be gripped, and on the other hand securely hold the piece object after it has been received. The object of the invention is also to suggest a corresponding method for receiving piece objects from above.

This object is achieved by a device with the features of the main claim as well as by a method claim. Advantageous further developments are to be derived from the features of the dependent claims and of the embodiment example.

The suggested gripping device comprises movable gripping elements for gripping the piece object by way of an inwards movement of the gripping elements. The gripping device is configured to receive piece objects from above and in particular permits a precisely targeted leading of the gripping device onto the piece object as well as a reliable holding of the received piece object. For this purpose, the gripping elements are arranged around a receiving opening which is delimited by the gripping elements, wherein the gripping device below the receiving opening comprises a guide means which surrounds the receiving opening, for the lateral guidance of the gripping device with the approach of the gripping device onto the piece object. Here, an inner diameter of the guide means at a lower end of the guide means is larger than a largest possible diameter of the receiving opening. The inner diameter of the guide means additionally tapers upwards. Here, the inner diameter at an upper end of the guide means is also yet again at least as large as the larger possible diameter of the receiving opening.

The suggested method is accordingly advantageous for receiving piece objects. With this method, the gripping device approaches the piece object from above such that the receiving opening is centred over an exposed part of the piece object or over an adapter which is fastened to the piece object, by way of lateral guidance on the guide element. By way of this, the gripping device lowers in a manner such that the gripping elements surround the exposed part of the piece object or the adapter which is fastened to the piece object, whereupon the gripping elements are moved inwards so that the gripping device subsequently holds the exposed part of the piece object or the adapter fastened to the piece object, such that the piece object is lifted with a subsequent upwards movement of the gripping device.

Typically, the gripping elements are each designed in a manner pivotable about a vertical axis at one end, for the iris-shutter-like size-reduction or enlargement of the receiving opening. A uniform embracing of the held piece object or of an adapter which is fastened to the piece object, from several sides is achieved by way of such a design. Preferably, the gripping device here comprises at least three gripping elements. However, four, five or more gripping elements can of course also be provided in order to delimit the receiving opening.

Usefully, the gripping device is configured for being fastened to or suspended on a manned or unmanned aircraft. In this embodiment, the gripping device is suitable for example for receiving piece objects by drones. The advantages of the suggested gripping device are particularly beneficial in this case since it is indeed on receiving loads by way of aircraft that it has often been found to be difficult to lower the respective aircraft or a gripping device fastened thereto over the piece object which is to be received, in an adequately precise manner so as to reliably receive the piece object.

As a rule, the gripping elements are arranged in an essentially rotationally symmetrical manner about a vertical axis which runs through a middle point of the receiving opening, so that a receiving of the piece object does not demand any particular orientation of the aircraft within the horizontal plane relative to the piece object to be received. For this purpose, the guide means is also typically designed in a rotationally symmetrical manner.

In some embodiments one can envisage the aircraft and the gripping device having a continuous opening along the axis which runs through the middle point of the receiving opening.

Typically, the guide means can be designed in the shape of a lateral surface of a truncated cone. An improved lateral guidance of the gripping device when the gripping device approaches the piece object is achieved by way of such a design.

The gripping device typically comprises an electrical drive and/or a pneumatic drive for moving the gripping elements. The drive is typically controllable by way of a control unit which can be designed for example as part of the gripping device or of the aircraft. In this embodiment, the gripping device is suitable for example for an autonomous receiving of the piece object by an unmanned aircraft.

One can envisage the gripping device comprising a drive, in particular an electrical and/or a pneumatic drive for the synchronous moving of the gripping elements. A synchronous inwards movement is advantageous inasmuch as the piece object can be centred particularly well laterally with respect to the vertical axes. The drive can be designed for example as an electric motor.

Usefully, a means for the optical data detection can be provided. This can be configured to acquire (detect) data which is represented on a received piece object. For example, a barcode reading device which can automatically detect the data which is coded in a barcode deposited on the piece object can be provided on the gripping device. The means for the optical data detection can be a camera for example. For example, one can envisage picture data or video data which is recorded by the camera being evaluated for an autonomous approach of the piece object or of an adapter fastened to the piece object, by way an unmanned aircraft.

Typically, the camera is arranged above the receiving opening, for example in the vertical axis which runs through the middle point of the receiving opening, and is aligned downwards. Of course, it is also possible for the means for the optical data detection to be designed as part of the aircraft.

An aircraft can also comprise a further camera additionally to the means for optical data detection which has been described above or alternatively to this. The further camera can be aligned for example in a manner such that a coverage region of the further camera is not covered over by a piece object whilst this is held by the gripping device. The further camera can be configured for example for detecting/acquiring video data or picture data for the control of the drone. Here, an evaluation of acquired picture data of landing regions or delivery zones which are marked in a coloured manner can be effected.

In typical embodiments, the guide means can comprise a single-part or multi-part standing surface at a lower end. The standing surface can lie in a plane which is parallel to the plane, within which the gripping elements are movable. This standing surface can be used for example as a rest surface of the gripping device on the piece object. The standing surface can have the shape e.g. of an annulus. Instead of this however, other shapes of the standing surface are also possible, for example the shape of a continuous or interrupted peripheral line of a polygon.

If the gripping device is fastened to a lower side of an aircraft, then the guide means can also serve as the landing gear of the aircraft. The aircraft then comes to stand on the standing surfaces of the guide means on landing on a surface, such as for example the upper side of the piece object. In particular, one can envisage the gripping device lowering until the single-part or multi-part standing surface lies on the upper side of the piece object, for receiving the piece object. In this case the guide means can serve for the lateral guidance of the complete aircraft before the landing so that for example on lowering onto an exposed part of a piece object, the aircraft is guided over piece object such that the exposed part of the piece object comes to lie within the receiving opening on account of a contact between the guide means and the piece object.

In further embodiments, the gripping device comprises a rotor or several rotors for the lateral movement of the gripping device. In this embodiment, the gripping device is particularly suitable for a floating suspension on an aircraft, for example with a cable. With a lowering onto the piece object, the gripping device can be moved laterally by the rotors such that the gripping device encloses an exposed part of the piece object or an adapter which is fastened to this.

A further embodiment envisages a system which comprises an adapter and a gripping device of the described type. Here, the adapter is typically configured for fastening to the piece object. Moreover, the adapter at least in an upper region has a diameter which is smaller than the largest possible diameter of the receiving opening. Here, the adapter in the upper region comprises an engagement surface for the gripping elements, said engagement surface being delimited to the top by a lateral projection. One succeeds in the adapter being able to be positively held by the gripping device by way of this lateral projection. In this manner, one succeeds in a force exerted onto the gripping elements being essentially perpendicular to a movement direction of the gripping elements. Piece objects of a different shape can be securely received and held by the gripping device by way of the use of such a system.

In some embodiments, the adapter is also configured for being fastened to other structures such as for example walls and/or ceilings. In this case, one can envisage the gripping device being positively held by the adapter. By way of this, for example an unmanned aircraft which is connected to the gripping device can be suspended on the adapter for its mounting on the adapter. For example, it is possible for the gripping device or a further gripping device for holding the aircraft to be fastened to an upper side of the unmanned aircraft so that this gripping device is accessible from above. In some embodiments, one can envisage an unmanned aircraft autonomously homing in on an adapter arranged on a room ceiling and embracing this with the gripping elements in a manner such that the gripping device and the aircraft are permanently held for example for the overhead storage of the aircraft. For this form of mounting, typically no active clamping of the gripping elements or no energy supply is necessary after the embracing of the adapter by way of the gripping elements.

In further embodiments, the adapter comprises electrical contacts which are configured to be connected to terminals on the gripping device or on the unmanned aircraft when the gripping device holds the adapter or is held by this. A charging function, with which a battery of the gripping device or of the unmanned aircraft is charged via the terminals and contacts can be realised in this manner.

Typically, the system comprises a height difference between the engagement surface and a lower side of the adapter, said difference corresponding to or being slightly larger than a distance between the plane, within which the gripping elements are movable, and the plane, in which the standing surface lies. The height difference between the engagement surface and the lower side of the adapter is to be understood as a shortest distance between an uppermost point on the engagement surface and a point on the lower side of the adapter. The plane mentioned above is to be understood as an uppermost of several planes, inasmuch as several planes within which the gripping elements are movable exist. By way of this design, one succeeds in the gripping elements being able to grip the adapter at the height of the engagement surface when the gripping device rests with its standing surface on an upper side of the piece object. At all events, this is the case when the piece object has a plane surface at this upper side and the adapter at its lower side is fastened to the plane surface of the piece object. The suggested dimensioning then advantageously ensures that the upper region of the adapter automatically projects adequately far into the receiving opening when the gripping device has been lowered over the adapter onto the piece object.

A further embodiment envisages a transport system which comprises a gripping device of the described type, as well as a transport means, wherein the gripping device is fastened to or suspended on a lower side of the transport means and is accessible from below or is a constituent of a body or of an attachment of the transport means, said constituent being accessible from below. In typical embodiments, the gripping device is fastened to the lower side of the transport means such that the gripping device is rigidly connected to the transport means. The transport means for example can be an unmanned or manned aircraft. In such an embodiment, the transport system is suitable for example for delivering parcels.

Embodiments of the invention are hereinafter described by way of the figures. There are shown in.

Figure 1:
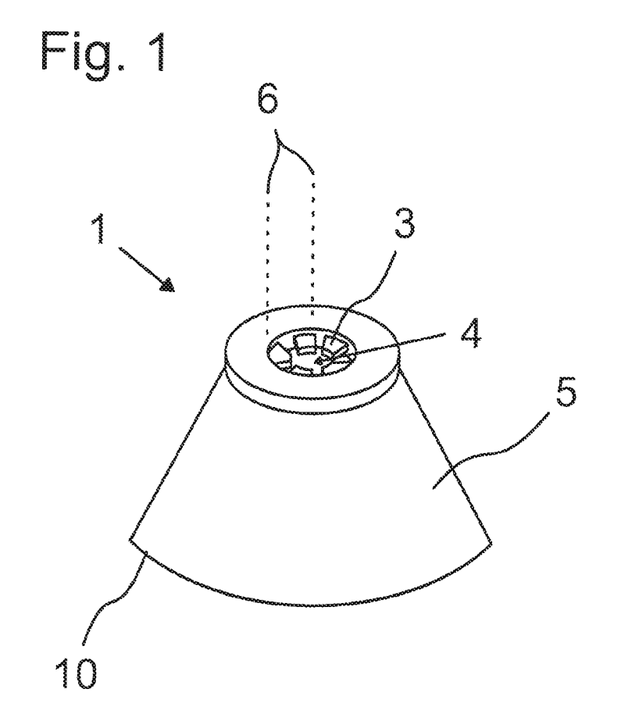
FIG. 1 a perspective view of a gripping device for receiving piece objects from above, FIG. 2 a plan view of the gripping elements of this gripping device which are designed in the manner of an iris shutter, FIG. 3 a cross section of a system which comprises the gripping device and an adapter, before receiving the piece object, FIG. 4 a cross section of the same system during the gripping of the piece object, FIG. 5 a cross section of the same system after the gripping of the piece object, FIG. 6 a lateral view of a transport system, comprising a transport means and a gripping device, as well as a piece object with an adapter which is fasted thereto, as well as FIG. 7 a lateral view of a transport system according to a further embodiment example.

FIG. 1 shows a gripping device 1 for receiving piece objects from above, said gripping device comprising a guide means 5 as well as gripping elements 3. The guide means 5 is designed in the form of a lateral surface of a truncated cone, so that it has a larger inner diameter at a lower end than at an upper end. At a lower side, the guide means 5 comprises a standing surface 10 which concerning the present embodiment example has the shape of an annulus. Above the guide means 5, the gripping elements 3 are arranged around a receiving opening 4 which is delimited by the gripping elements 3. The gripping elements 3 are designed in laterally movable manner and can each be pivoted inwards in the manner of an iris-shutter about a vertical axis 6 which is located at their ends. Such a pivoting movement results in a size reduction of the receiving opening 4.

Figure 2:
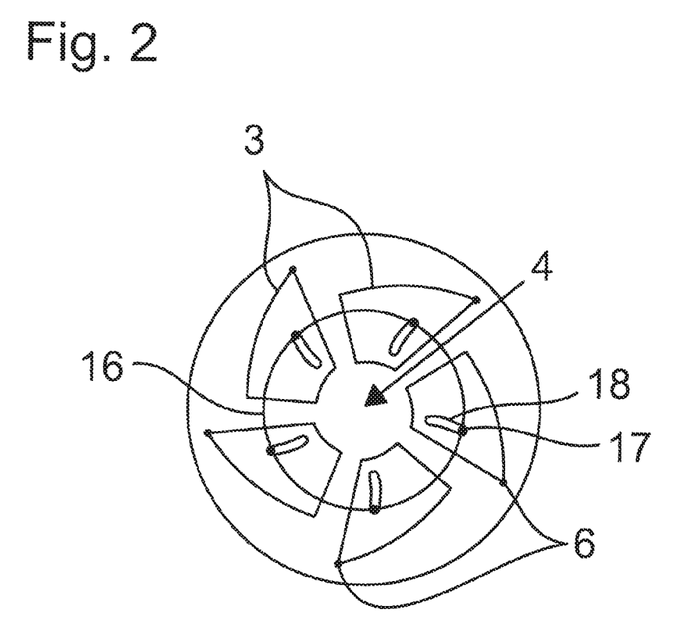

FIG. 2 shows a plan view of the gripping elements 3 which are designed in the manner of an iris shutter and which in the present example are designed as five flat discs. The edges of the discs which lie to the inside delimit a receiving opening 4. The discs are each pivotably suspended at one of their ends. A pivoting movement of one of the discs is effected about a respective one of the in total five vertical axes 6. A rotatable adjusting collar 16 is moreover provided for the synchronous pivoting of the gripping elements 3. The adjusting collar 16 comprises five projecting drivers 17 which engage into slot-like recesses 18 in the gripping elements 3. A rotation of the adjusting collar 16 in the clockwise direction leads to an enlarging of the receiving opening.

Figure 3:
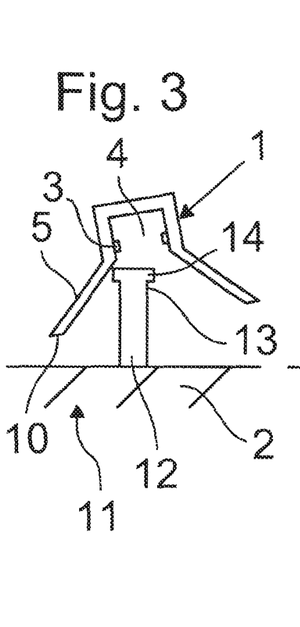
Figure 4:
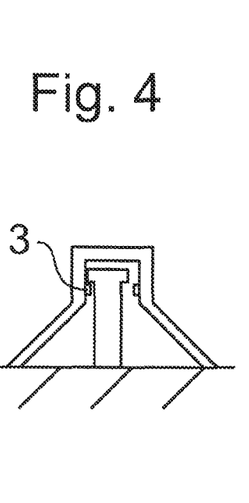
Figure 5:
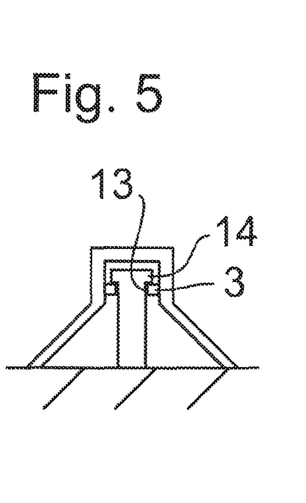

A system 11 of the gripping device 1 and an adapter 12 is represented in FIGS. 3 to 5. FIG. 3 shows a moment before the receiving. The adapter 12 in its lower region is characterised by a cylinder shape and at its upper end comprises an engagement surface 13 for the gripping elements 3. The engagement surface 13 is delimited to the top by way of a lateral projection 14 which is likewise cylinder-shaped. The diameter of the lateral projection 14 is smaller than the largest possible diameter of the receiving opening 4, so that the gripping device 1 can be led from above onto the adapter 12 given an opened position of the gripping elements 3. The adapter 12 and the gripping device 1 are additionally designed such that a height difference between a lower side of the adapter 12 and the engagement surface 13 corresponds to the height difference between the standing surface 10 and the gripping elements 3 which are pivotable in a plane which is parallel to the standing surface 10. The adapter is fastened to an upper side of the piece object 2. The gripping device 1 moves towards the adapter laterally from above, and a contact between the guide means 5 and the adapter 12 occurs, by which means on lowering, the gripping device 1 is guided laterally such that the adapter 12 subsequently projects into the receiving opening 4 whilst the standing surface 10 comes to lie on the piece object 2. FIG. 4 shows such a point in time during the receiving, at which point the gripping device 1 with the gripping elements 3 surrounds the adapter 12, but at which the adapter 12 is not yet centred with respect to the receiving opening. A synchronous inwards movement of the gripping elements 3 is subsequently effected, by which means the gripping device 1 laterally centres itself and thereafter holds the adapter on the engagement surface 13, as shown in FIG. 5. The lateral projection 14 ensures a positive connection given a subsequent upwards movement of the gripping device 1, so that the adapter 12 lies with the lateral projection 14 on the gripping elements 3 and the piece object 2 is lifted.

Figure 6:
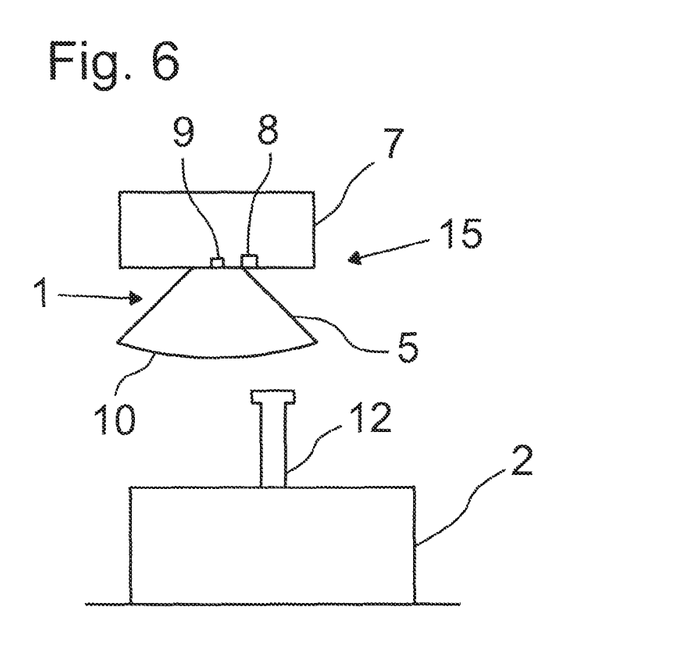

A transport system 15, comprising a gripping device 1 of the previously described type, and a transport means 7, as well as an suitable adapter 12 which is located on a piece object 2 are represented in FIG. 6 The adapter 12 is fastened at a lower side to a strapping band which is wound around the piece object 2. The transport means 7 is designed as an unmanned aircraft or drone. The gripping device 1 is fastened to a lower side of the transport means 7 and is rigidly connected to the transport means 7 or is a integral part of a body or of an attachment of the transport means 7. The gripping device 1 comprises a drive 8, for example an electrical or pneumatic drive, for the synchronous moving of the gripping elements 3. The aircraft can comprise a continuous opening, for example above the receiving opening. The gripping device 1 additionally comprises a means 9 for the optical data detection. This is configured to acquire or detect data on the piece object 2 or on the adapter 12, said data for example being represented in the form of a bar code. The gripping device 1 and/or the aircraft in some embodiments can additionally also comprise one or more cameras which are configured to record picture data which can be evaluated for example for a precisely targeted approach of the adapter 12. In other embodiment examples, the adapter 12 can also be fastened for example to a room ceiling, so that the transport means 7 can be suspended on the adapter 12 by way of a gripping this. Here, the adapter 12 can be gripped by the gripping device 1 described above or by a further gripping device which is arranged for example at a side of the transport means 7 which is away from the gripping device 1. Additionally, one can envisage the adapter 12 comprising electrical contacts which are connected to terminals which are located on the transport means for charging a battery of the transport means 7. Concerning the represented embodiment example, the guide means 5 simultaneously functions as a landing structure of the drone, so that the complete drone or the complete transport means 7 after landing on the piece object 2 comes to stand on the standing surface 10 there for the purpose of receiving the piece object 2. Of course, in a modification of this embodiment example, the transport means 7 can also be a manned aircraft for example a helicopter.

Figure 7:
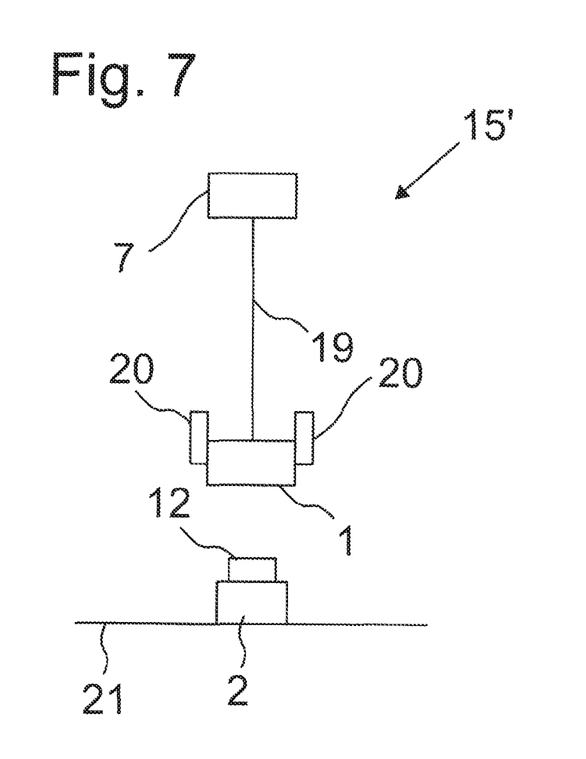

FIG. 7 shows a further transport system 15'. This differs from the transport system 15 described above in that the gripping device 1 is floatingly suspended on a lower side of the transport means 7 by way of a cable 19. The gripping device 1 additionally comprises several rotors 20 which are automatically controllable by the transport means 7, for example a drone. Moreover, a height of the gripping device 1 with respect to the height of the transport means 7 can be set by way of pulling in or letting out the cable 19. A piece object 2 which is located on the ground 21 is additionally schematically shown in the drawing. A schematically represented adapter 12 is fastened to an upper side of the piece object 2.

For receiving the piece object 2, the transport means 7 is firstly coarsely placed above the piece object 2, or the transport means 7 automatically homes in on such a position. The gripping device 1 is subsequently lowered by way of lowering the transport means 7 and/or by way of letting out the cable 19 in the direction of the ground 21. During the lowering of the gripping device 1, this is laterally driven by the rotors 20 in a manner such that a lateral position of the gripping device 1 is corrected such that the gripping device 1 lowers in the direction of the adapter 12 and subsequently embraces this for gripping the adapter 12. A control of the rotors 20 is effected here in an automated manner, for example by way of a picture recognition by way of cameras arranged on the gripping device 1. The rotors 20 here are typically activated or controlled such that on the one hand the adapter 12 is approached by the gripping device 1 in an accurately targeted manner and that one the other hand a horizontal orientation of the gripping device 1 is stabilised or maintained.

Features of the different embodiments which are only disclosed in the embodiment examples can be combined with one another and claimed individually.

The invention claimed is:

1. A transport system comprising:
   an unmanned aircraft; and
   a gripping device configured to receive piece objects from above, the gripping device including movable gripping elements for gripping the piece object by way of an inwards movement of the gripping elements,
   wherein the gripping device is rigidly connected to the unmanned aircraft,
   wherein the gripping elements are arranged around a receiving opening which is delimited by the gripping elements, wherein the gripping device below the receiving opening comprises a guide which surrounds the receiving opening for the lateral guidance of the gripping device given an approach of the gripping device onto the piece object, wherein an inner diameter of the guide at a lower end of the guide is larger than a largest possible diameter of the receiving opening and wherein the inner diameter of the guide tapers upwards, wherein the gripping device is configured to fasten to or suspend from a lower side of the unmanned aircraft and to configured to be accessible from below or be a portion of a fuselage of the unmanned aircraft, the portion being accessible from below.

2. The transport system of claim 1, wherein the gripping elements are each arranged in a manner pivotable about a vertical axis (6) at one end for an iris-shutter-like size reduction or enlargement of the receiving opening.

3. The transport system of claim 1, wherein the guide is shaped in the shape of a lateral surface of a truncated cone.

4. The transport system of claim 1, wherein the gripping device comprises a drive (8) for synchronously moving the gripping elements.

5. The transport system of claim 1, wherein the gripping device further comprises an optical data detector, wherein the optical data detector is configured to detect data represented on a received piece object.

6. The transport system of claim 1, wherein the guide comprises a single-part or multi-part standing surface at a lower end, wherein the standing surface lies in a plane that is parallel to a plane within which the gripping elements are movable.

7. The transport system of claim 1, further comprising an adapter, wherein the adapter is configured for being fastened to the piece object, wherein the adapter at least in an upper region has a diameter that is smaller than the largest possible diameter of the receiving opening, and wherein the adapter in the upper region comprises an engagement surface for the gripping elements, said engagement surface being delimited to the top by a lateral projection.

8. The transport system of claim 7, wherein a height difference between the engagement surface and a lower side of the adapter is just as large or slightly larger than a distance between the plane within which the gripping elements are movable and the plane in which a standing surface lies.

9. A method for receiving piece objects using the transport system of claim 1 for gripping the piece object by way of an inwards movement of the gripping elements, the method comprising using the gripping device approaching the piece object from above, centering the receiving opening over an exposed part of the piece object or over an adapter which is fastened to the piece object, by way of a lateral guidance on the guide, lowering the gripping device in a manner such that the gripping elements surround the exposed part of the piece object or the adapter fastened to the piece object, whereupon the gripping elements are moved inwards so that the gripping device subsequently holds the exposed part of the piece object or the adapter that is fastened to the piece object, so that the piece object is lifted given a subsequent upwards movement of the gripping device.

10. The method for receiving piece objects of claim 9, comprising lowering the gripping device until a single-part or multi-part standing surface at a lower end of the guide lies on an upper side of the piece object.

* * * * *